Patented Apr. 23, 1940

2,198,375

UNITED STATES PATENT OFFICE 2,198,375

HIGHER POLYALKYLATED CYCLOHEXYL DERIVATIVE

Herman A. Bruson, Philadelphia, Pa., assignor to Röhm & Haas Company, Philadelphia, Pa.

No Drawing. Application December 8, 1938, Serial No. 244,585

8 Claims. (Cl. 260—617)

This invention relates to the catalytic hydrogenation of isophorones having from 15 carbon atoms upwards in the molecule, and to the new hydrogenation products obtained thereby.

The present application is a continuation-in-part of copending application Serial No. 196,388, filed March 17, 1938 now U. S. Patent No. 2,148,103.

The new hydrogenation products, which are obtained by subjecting isophorones having at least 15 carbon atoms, derived from aliphatic methyl ketones having at least five carbon atoms, to the action of hydrogen at elevated temperatures and pressures in the presence of active hydrogenation catalysts, as described further herein, are colorless oils of faint yet pleasant odor, containing carbon, hydrogen, and oxygen. Chemically, they are polyalkylated cyclohexanols and polyalkylated cyclohexanones which contain either four or five alkyl groups as nuclear substituents of the hydroaromatic ring, two of which alkyl groups are geminally substituted; i. e., on the same nuclear carbon atom. This mixture can be separated by suitable distillation into the individual ketone and alcohol components.

Compounds of the above character, containing at least 15 carbon atoms in the molecule, are obtained according to this invention, by starting with the respective isophorones which are obtainable by heating aliphatic methyl ketones of at least five carbon atoms with oxides, hydroxides, alkoxides, or amides of alkali metals at temperatures above 100° C. at atmospheric pressure or at superatmospheric pressure, so as to split out water as described and claimed in my copending application, Serial No. 196,388 filed March 17, 1938.

By the present process it becomes commercially feasible to transform lower molecular weight, saturated, aliphatic methyl ketones of at least five carbon atoms to higher molecular weight polyalkyl cyclohexanols and polyalkyl cyclohexanones containing from 15 carbon atoms upwards. These products contain four or five alkyl substituents attached to the cyclohexane ring, two of the alkyl groups being attached to the same carbon atom.

As typical starting materials for the process, the following isophorones may be used—

$C_{15}$-isophorone ($C_{15}H_{26}O$) B. P. 121–124° C./2 mm. obtained from methyl propyl ketone $C_{18}$-isophorone ($C_{18}H_{32}O$) B. P. 124–126° C./3 mm. obtained from methyl isobutyl ketone.

$C_{21}$-isophorone ($C_{21}H_{38}O$) B. P. 156–158° C./1–2 mm. obtained from methyl amyl ketone.

$C_{24}$-isophorone ($C_{24}H_{44}O$) B. P. 187–190° C./3 mm. obtained from methyl hexyl ketone.

$C_{33}$-isophorone ($C_{33}H_{62}O$) B. P. 245–250° C./3 mm. obtained from 5-ethyl-nonanone-2.

$C_{57}$-isophorone ($C_{57}H_{110}O$) obtained from methyl heptadecyl ketone.

Other isophorones derived from methyl-isopropyl ketone, methyl-n-butyl ketone, methyl heptyl ketone, methyl octyl ketone, methyl nonyl ketone, and higher homologues thereof may also be used. The isophorones may be made from any saturated, aliphatic ketone containing five or more carbon atoms with a methyl group next to the carbonyl group and at least one hydrogen atom on the α-carbon atom of the other alkyl group. The ketone may be straight or branched-chain.

The products obtained by the catalytic reduction of the above isophorones having from 15 carbon atoms upwards are useful as lubricants, softening agents for rubber, resins, leather, or textiles, and as bases and fixatives for perfumes and cosmetics. The alcoholic components of the catalytic reduction products obtained give, with sulfonating agents or with excess ethylene oxide, water-soluble capillary-active compounds useful as wetting, cleansing, penetrating, emulsifying and spreading agents. Their esters with monobasic or polybasic acids, such as their acetates, propionates, butyrates, lactates, phthalates, maleates, succinates, oleates, stearates, and phosphates, are useful as plasticizers for various resins for cellulosic esters and ethers. Their thiocyanates are oil-soluble insecticides.

The reduction by hydrogen of the isophorones having 15 carbon atoms or more is accomplished at temperatures of about 100° C. to about 225° C. In the lower range of temperature the reaction velocity is slow and above 200° C. hydrocarbons tend to be formed. Pressures of 100 lbs. per square inch and up are satisfactory, but the preferred pressures lie between 500 lbs. per square inch, where the hydrogenation becomes sufficiently rapid for practical purposes, and 4000 lbs. per square inch, which is a practical limit for convenience of operation.

An active hydrogenation catalyst is necessary. Suitable catalysts include in addition to those of the platinum-palladium group of finely divided metals, finely divided nickel, cobalt, and copper chromite. The catalyst may be mounted on a suitable carrier, such as pumice, if so desired.

The reduction of the double bond with the formation of the saturated cyclic ketone takes place relatively easily. Hence, by working under less vigorous conditions as to time, temperature, pressure and catalyst the hydrogenation may be limited essentially to the double bond. Copper chromite seems to favor obtaining the saturated ketone. Under more vigorous conditions of reduction and, particularly, with more active catalysts, such as finely divided nickel, the reaction may be carried on until almost 100% of the material is reduced to the cyclohexanol form. But it should be noted that the keto group of isophorones containing 15 or more carbon atoms is somewhat resistant to reduction and hydrogenation must be carried on vigorously for relatively long periods of time. Thus, the $C_{21}$ isophorone required 12 hours at 150° C. and 3000 lbs. hydrogen pressure for a reduction of over 90% to the saturated $C_{21}$-cyclohexanol. If so desired, the hydrogenation may be carried out in two stages, in the first of which copper chromite may be used to yield the saturated ketone, which in turn may be reduced over nickel to the polyalkylated cyclohexanol. It is thus possible to obtain saturated cyclic ketones or cyclic alcohols or mixtures of the two.

A solvent may be used as an inert liquid medium during the reduction. Alcohol, dioxane and cyclohexane are examples of suitable inert liquids. Such solvents are readily stripped from the hydrogenation products, which may be then separated by distillation under reduced pressure.

The hydrogenated products of the isophorones are conveniently described as polyalkylated oxygenated cyclohexyl derivatives. When oxygen is attached directly to the cyclohexyl group, it is present either in the keto form or the hydroxyl form. Either form is obtainable in the process of hydrogenation, but usually the product of the catalytic reduction is a mixture containing both forms.

In order to illustrate this invention, the following examples are given—

*Example 1.*—The $C_{15}$-isophorone ($C_{15}H_{26}O$) which is obtained by heating 6 parts by weight of methyl-propyl ketone with one part of powdered potassium hydroxide under a reflux condenser attached to a water trap, and which is an oil having the following constants when pure—

B. P. 121–124° C./2 mm.; $n_D^{25}$ 1.4780; $d_{25}$ 0.9088 was mixed with 10% by weight of Raney nickel catalyst and heated at 150° C. with hydrogen under 1500 lbs./sq. in. pressure for 8 hours. The product obtained after removal of the catalyst was a colorless, viscous oil of faint, sweet odor. Upon fractionation through an efficient column, a cut, boiling at 103–109° C./2 mm., was obtained which possessed the following constants—

$n_D^{25}$ 1.4697; $d_{25}$ 0.9009; Hydroxyl No. 245

The theoretical hydroxyl number for the saturated $C_{15}$-cyclohexanol $C_{15}H_{29}OH$ is 248.

Its acetate may be obtained by heating the above alcohol with acetic anhydride, as a colorless oil, boiling at 131–132° C./5 mm.

The thiocyanic acid ester is an oil having insecticidal properties.

*Example 2.*—The $C_{18}$-isophorone ($C_{18}H_{32}O$) which is obtained from methyl isobutyl ketone by heating with one-fifth its weight of powdered potassium hydroxide under a reflux condenser attached to a water trap until no more water distills off, and which is an oil having the following constants when pure—

B. P. 124–126° C./3 mm.; $n_D^{25}$ 1.4729; $d_{25}$ 0.8761 was mixed with an equal volume of alcohol and 10% by weight of Raney nickel catalyst, and heated at 155° C. with hydrogen under 1500 lbs./sq. in. pressure for 8 hours. The product obtained after removal of the catalyst was then distilled. After the alcohol had distilled off, the product boiled at 139–141° C./5 mm. It was a thick, colorless oil which, according to its hydroxyl number (120.4) was a mixture containing 58% of the saturated $C_{18}$-cyclohexanol and 42% of the saturated $C_{18}$-cyclohexanone, each containing 4 or 5 alkyl groups attached to the cyclohexyl nucleus.

*Example 3.*—The $C_{21}$-isophorone ($C_{21}H_{38}O$) which is obtained by boiling methyl-n-amyl ketone with one-fifth its weight of potassium hydroxide until water is no longer evolved, and which is an oil having the following constants—

B. P. 156–158° C./2 mm.; $n_D^{25}$ 1.4729; $d_{25}$ 0.8834 was hydrogenated under 1500 lbs./sq. in. hydrogen pressure in the presence of 10% by weight of Raney nickel at 150–160° C. for 6 hours. The product obtained is a colorless, viscous oil, consisting of a mixture of the saturated cyclohexanone and the cyclohexanol, containing a total of 21 carbon atoms in the molecule.

*Example 4.*—The $C_{24}$-isophorone ($C_{24}H_{44}O$) which is obtained from methyl-n-hexyl ketone by boiling with one-fifth its weight of sodium hydroxide until water is no longer evolved, and which is an oil having the following constants when pure—

B. P. 187–190° C./3 mm.; $n_D^{25}$ 1.4711; $d_{25}$ 0.8743 was mixed with an equal volume of ethanol and 10% by weight of Raney nickel catalyst, and heated at 155° C. with hydrogen under 2000 lbs./sq. in. pressure for 12 hours. The product obtained after removal of the catalyst and solvent was a viscous, colorless oil boiling at 158–160° C./0.5 mm., and having a hydroxyl number of 149.2, indicating a content of 93.7% of a $C_{24}$ cyclohexanol containing four or five alkyl groups in the molecule.

Upon acetylation it forms a colorless liquid acetate, boiling at 156–158° C./0.5 mm., having a saponification number 128, indicating a purity of 90% ester. In the same manner, the $C_{33}$-isophorone from 5-ethyl-nonanone-2 yields a tetra or penta alkylated cyclohexanol having 33 carbon atoms. It is a colorless, viscous oil boiling at about 250° C./1–2 mm.

The $C_{57}$-isophorone likewise yields a 57-carbon atom cyclohexanol as a colorless oil.

I claim:

1. A hydrogenation product of an isophorone having at least 15 carbon atoms.

2. A hydrogenation product of an isophorone, having at least 15 carbon atoms, which product contains polyalkylated cyclohexanols and cyclohexones.

3. A hydrogenation product of an isophorone having at least 15 carbon atoms, which product contains a polyalkylated cyclohexanol as the chief component.

4. A hydrogenation product of an isophorone having at least 15 carbon atoms, which product contains a polyalkylated cyclohexanone as the chief component.

5. A hydrogenation product of a $C_{15}$-isophorone derived from methyl propyl ketone, which product contains polyalkylated cyclohexanols and cyclohexones.

6. A hydrogenation product of a $C_{18}$-isophorone derived from methyl isobutyl ketone, which product contains polyalkylated cyclohexanols and cyclohexones.

7. A hydrogenation product of a $C_{24}$-isophorone derived from methyl hexyl ketone, which product contains polyalkylated cyclohexanols and cyclohexones.

8. The process for preparing polyalkylated cyclohexanols and cyclohexones which comprises reducing an isophorone having at least 15 carbon atoms with hydrogen in the presence of an active hydrogenation catalyst.

HERMAN A. BRUSON.